United States Patent

McDonald et al.

[15] 3,664,180
[45] May 23, 1972

[54] ULTRASONIC DETECTION OF LUMBER DEFECTS

[72] Inventors: Kent A. McDonald, Cross Plains, Wis.; Roger G. Cox, Loveland, Colo.

[73] Assignee: The United States of America as represented by the Secretary of Agriculture

[22] Filed: July 15, 1970

[21] Appl. No.: 55,110

[52] U.S. Cl. ............................................. 73/67.6
[51] Int. Cl. ............................................. G01n 29/04
[58] Field of Search ..................... 73/67, 67.5, 67.6

[56] References Cited

UNITED STATES PATENTS

| 3,521,483 | 7/1970 | Miller et al. | 73/67.5 |
| 3,066,525 | 12/1962 | Harris | 73/67.5 X |
| 3,323,354 | 6/1967 | Daubresse et al. | 73/67.8 |

*Primary Examiner*—Richard C. Queisser
*Assistant Examiner*—Arthur E. Korkosz
*Attorney*—R. Hoffman and W. Bier

[57] ABSTRACT

A method of locating, by ultrasonic inspection, internal defects in wood. The transit time of ultrasonic pulses through the wood, in a direction substantially perpendicular to the grain, is measured at approximately one-half inch intervals along the length and across the width of the board. The inspection is made under water. Comparison of the transit times between adjacent measurement locations provides an indication of a defect such as a knot or steep grain area between the measurement points.

3 Claims, 4 Drawing Figures

PATENTED MAY 23 1972 3,664,180

INVENTORS
KENT A. McDONALD
ROGER G. COX
BY
R. Hoffman
Attorney

ULTRASONIC DETECTION OF LUMBER DEFECTS

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

1. Field of the Invention

This invention relates to the inspection of lumber, with particular reference to an ultrasonic sensing process to locate the position and determine the size of inherent defects in wood flitches.

2. Description of the Prior Art

In general, the inspection of lumber for manufacturing decisions is done visually. Human judgment is primarily the method presently used to locate the position and to determine the size of inherent defects in wood flitches.

The use of ultrasonic examination of wood products has been limited to finding decay in standing poles and detecting plywood blisters. These techniques use the attenuation of the ultrasonic signal caused by cavities within the wood. Ultrasonic amplitude attenuation methods are not sensitive to solid defects in the wood such as knots or steep grain.

SUMMARY OF THE INVENTION

In general, the principal improvement provided by this invention resides in an ultrasonic pulse delay method to detect inherent defects in lumber. Tests involving the use of this process have shown a capability to sense and record the location and size of knots and steep grain areas in a variety of species of wood including maple, birch, oak, and pine.

The process involves measuring and recording the transit time of ultrasonic pulses through wood boards in a direction substantially perpendicular to the direction of the grain. Measurements are made at a plurality of points comprising a two dimensional grid reference system over the surface of the board. Both the transit time of the pulse and the grid coordinates of the point at which the measurement is taken are recorded. The data is analyzed by comparing the transit times at adjacent grid positions to determine both the size of the defect and its location on the board.

Accordingly an object of this invention is to provide a means of locating and identifying defects in wood, the data from which can be applied to an automated system for use in the grading and subsequent processing of lumber. Another object is to provide a more efficient method of locating defects to reduce the time and expense of current methods. A further object is to provide data on the size and location of defects in wood which can be processed by a computer to determine the optimum number, size, and grade of wood products to be made from a given amount of raw material.

BRIEF DESCRIPTION OF THE DRAWINGS

Referring to the accompanying drawings.

DESCRIPTION OF THE PREFERRED EMBODIMENTS

Figure 1:
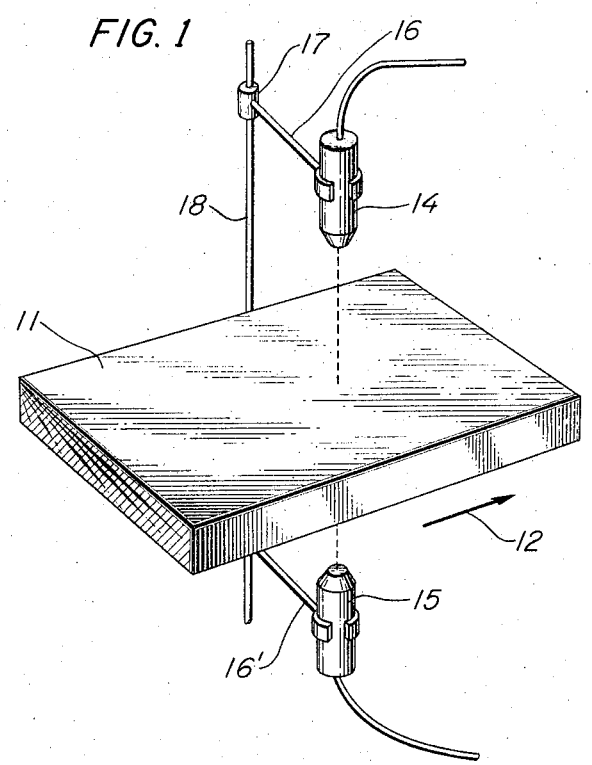
FIG. 1 is a perspective view of the inspection apparatus.

More specifically, referring to FIG. 1, the wood sample 11 to be examined is positioned such that the grain direction, designated by reference arrow 12, is substantially horizontal. The sample is examined under water which acts as a couplant to reduce the attenuation of the ultrasonic signals during inspection.

Transmitting transducer 14 and receiving transducer 15 are positioned coaxially along an axis substantially perpendicular to the grain direction, indicated by reference arrow 12, of the wood sample. Transmitting transducer 14 is located approximately 1 centimeter above the upper surface of the wood sample and receiving transducer 15 is located approximately 1 centimeter below the bottom surface. The orientation and alignment of the transmitting and receiving transducers relative to each other and to the upper and lower surfaces of the sample is maintained by suitable means, here shown as brackets 16 and 16' and clamp 7 which connect the transducers to support member 18 which is aligned substantially perpendicular to the grain direction 12 of the wood sample.

Figure 2:
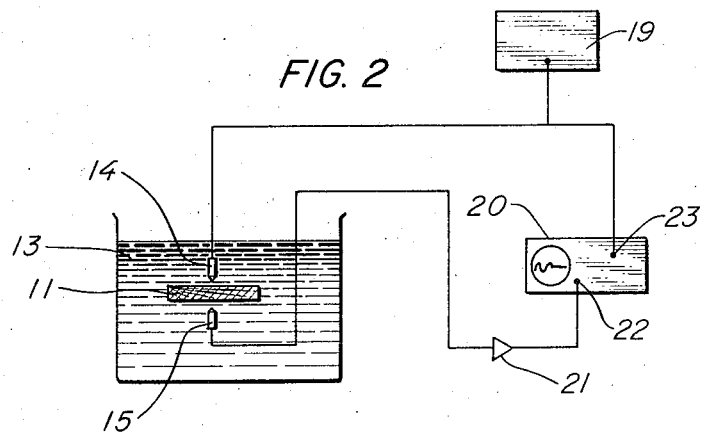
FIG. 2 is a schematic diagram showing the layout of the apparatus and associated instrumentation.

As shown in FIG. 2, transmitting transducer 14 is connected to pulse generator 19. The pulse generator shock excites the transducer with an electrical pulse of 200 volts dc and pulse length of approximately 3 microseconds. Transmitting transducer 14 converts this electrical pulse into an ultrasonic vibration at its resonant frequency of approximately 400 kilohertz. The ultrasonic pulse travels through the surrounding water 13 and wood sample 11 and is detected by receiving transducer 15. The receiving transducer converts the ultrasonic vibrations to electrical signals which are applied through amplifier 21 to the vertical deflection input 22 of delayed sweep cathode ray oscilloscope 20. Pulse generator 19 is connected to the external trigger input 23 of the oscilloscope so that the horizontal sweep begins when a pulse is generated. The horizontal distance between the beginning of the sweep and the leading edge of the pulse from the receiving transducer multiplied by the time calibration scale of the oscilloscope gives the transit time of the ultrasonic pulse between the transducers.

The apparatus and method described above relates to making a single measurement at one point on the sample. By moving the transducers relative to the wood or by moving the sample or by using several sequentially excited transducers a series of measurements can be made both along the length and across the width of the wood sample. Pulse transit time data is desirably obtained at approximately one-half inch intervals along each of these axes so that data is available in the format of a horizontal grid covering the entire wood sample.

The location and size of defects in the wood sample are determined by comparing the difference in transit times between measurements made at adjacent points. It has been determined that when transducers 14 and 15 are spaced four and 5/10 4.5 centimeters apart a difference in transit times of 5/10 0.5 microsecond or greater between two adjacent measurements is an indication of a knot or steep grain defect in the wood between these two measurement points. The size of the defective area in the wood is obtained by forming an outline which subsumes each of the defective units thus obtained. The entire area of the wood sample within the boundaries of this outline is considered defective.

Figure 3:
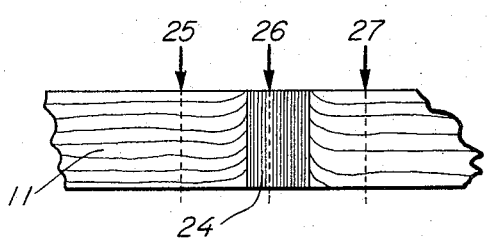
FIG. 3 is a cross sectional view of a wood sample showing the measurement geometry in the area of a knot.

More specifically, FIG. 3 is a cross section view showing the measurement sequence in the area of knot 24 in the wood sample. Three measurement axes, designated 25, 26, and 27, are shown at adjacent points along and substantially perpendicular to the longitudinal axis of the sample. The grain direction of the clear, straight grain areas of the wood surrounding knot 24 runs substantially parallel to the longitudinal axis of the sample so that measurement axes 25 and 27 through this area cross substantially perpendicular to the rain. The grain of knot 24 runs substantially perpendicular to the surrounding grain so that measurement axis 27 runs through the knot substantially parallel to the grain.

The velocity of the ultrasonic wave in wood is slowest when the wave travels in a direction perpendicular to the grain. The velocity increases as the angle between the grain direction and the direction of travel decreases from perpendicular, as it essentially is along axes 25 and 27, to parallel, as it essentially is along axis 26 through the knot. Thus ultrasonic signals propagated along axis 26 will pass through the sample faster than signals along adjacent axes 25 and 27. This difference in transit time is recorded and provides an indication of a defect in the sample between axes 25 and 26 and between axes 26 and 27.

Figure 4:
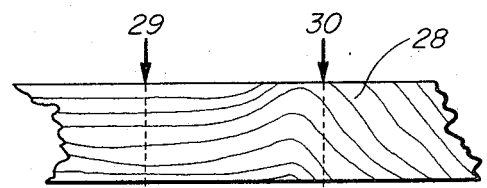
FIG. 4 is a cross sectional view of a wood sample showing the measurement geometry in an area of steep grain.

A similar result is obtained when areas of steep grain are encountered in the wood sample. As shown in FIG. 4, measurement axis 29 runs substantially perpendicular to the grain of the sample. Ultrasonic signals propagated along adjacent measurement axis 30 which runs through the steep grain defect area 28 encounter the wood grain at a lower angle than signals along the adjacent path 29. These ultrasonic signals initiated along axis 30 will have a higher velocity through the sample and hence will have a shorter transit time than the signals along axis 29.

Having thus disclosed our invention, we claim:

1. The process for locating defects in the grain structure of wood wherein the defects to be detected are knots and steep grain areas within the wood, by propagating ultrasonic pulses through a wood specimen in a direction substantially perpendicular to the grain direction of the sample and measuring the transit time of said pulses through the wood at a plurality of locations over the surface of the sample, the difference in transit times of said pulses between adjacent measuring locations on the sample being caused by a variation of the pulse velocity as the grain direction varies at certain locations, said velocity increasing as the direction of the grain and the pulse direction become substantially parallel at knots and steep grain areas and thereby providing an indication of the presence of the defect within the sample at said certain locations.

2. The process of claim 1 wherein the frequency of the ultrasonic waves is between 200 and 800 kilohertz.

3. The process of claim 1 wherein measurements are made at one-eighth inch to 1 inch intervals along the length and across the width of the specimen.

* * * * *